United States Patent
Müller et al.

(10) Patent No.: US 6,747,235 B2
(45) Date of Patent: Jun. 8, 2004

(54) METHOD AND APPARATUS FOR WELDING SHEET OVERLAPS

(75) Inventors: Eugen Müller, Dietikon (CH); Jean-Paul Ruscher, Schalkendorf (FR)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 09/916,378

(22) Filed: Jul. 27, 2001

(65) Prior Publication Data

US 2002/0011466 A1 Jan. 31, 2002

(30) Foreign Application Priority Data

Jul. 27, 2000 (CH) ............................................ 1495/00

(51) Int. Cl.[7] .............................................. B23K 11/06
(52) U.S. Cl. .......................................... 219/64; 219/81
(58) Field of Search ................................ 219/64, 81, 83

(56) References Cited

U.S. PATENT DOCUMENTS

| | | | |
|---|---|---|---|
| 1,438,867 A | * 12/1922 | Schroeder | ..................... 219/81 |
| 3,548,178 A | 12/1970 | Huber et al. | |
| 4,144,440 A | * 3/1979 | Schalch et al. | ............. 219/111 |
| 4,389,556 A | * 6/1983 | Nozawa et al. | ............. 219/118 |
| 4,414,455 A | 11/1983 | Schneider et al. | |
| 4,677,272 A | * 6/1987 | Tajiri | ........................... 219/110 |
| 4,879,445 A | * 11/1989 | Kawano et al. | ................ 219/64 |
| 5,237,147 A | 8/1993 | Pazzaglia | |
| 5,313,041 A | * 5/1994 | Levy et al. | ................... 219/109 |
| 5,391,853 A | * 2/1995 | Grau et al. | .................... 219/81 |
| 5,622,637 A | 4/1997 | Taiana | |
| 5,676,862 A | * 10/1997 | Matteson | ..................... 219/110 |
| 5,841,094 A | * 11/1998 | Baumgartner | ................ 219/110 |
| 5,951,885 A | * 9/1999 | Takahashi et al. | ............. 219/64 |

FOREIGN PATENT DOCUMENTS

| | | |
|---|---|---|
| EP | 0 273 984 | 1/1988 |
| JP | 2000141049 | 5/2000 |

OTHER PUBLICATIONS

Copy of Search Report for EP 01 11 7489 dated Aug. 28, 2002.

* cited by examiner

Primary Examiner—Kiley Stoner
Assistant Examiner—Len Tran
(74) Attorney, Agent, or Firm—McCormick, Paulding & Huber LLP

(57) ABSTRACT

Where can bodies of sheet metal are welded between the welding rollers of a welding machine, the welding current is not applied to the welding rollers until the body is between the welding electrode rollers. In this way, the quality of the weld at the initial weld point is improved, and where intermediate wire electrodes are used, wire breaks are reliably prevented.

9 Claims, 3 Drawing Sheets

State of the Art

State of the Art

METHOD AND APPARATUS FOR WELDING SHEET OVERLAPS

BACKGROUND OF THE INVENTION

1. Technical Field

The present invention relates to methods and apparatus for welding sheet metal in general, and in particular to automated methods and apparatus for welding discrete sheet metal bodies.

2. Background Information

It is known to weld sheet overlaps with welding rollers, especially with the aid of intermediate wire electrodes, such as in the welding of can bodies for example. A problem that arises especially when articles are welded individually, in particular can bodies where each body impinges individually on welding rollers in the horizontal position, as may be the case on manual welding machines or automatically fed welding machines, is that of welding the initial weld point at the start of the can body or other article to be welded. Because the welding energy or heat introduced at that point can only diffuse in one direction along the line of the seam, application of the full rated welding current for welding the overlapping seam at the initial point results in burning, or a defective welded joint. It is therefore known in the state of the art to reduce the welding current initially, as indicated in the schematic time/current diagram of FIG. 1. Accordingly, on the welding machine, the welding AC voltage or current and the drive to the welding rollers and/or wires are activated at a time Pt. 1 with the welding current source impressing a reduced welding current with a current value A which is lower than the rated current value B for the overlapping seam. The welding current 1 may for example be a 50 Hz alternating current.

At a time Pt. 2, the travel carriage of the welding machine, which carries the article to be welded e.g. a can body 2, reaches a predetermined position in front of the welding rollers, whereupon a time interval t1 commences at the end of which the rated current value B is impressed at the electrode wires by the welding current source. The article, in this case the body 2, reaches the electrode wires at a random point in time with respect to the welding current 1, e.g. as shown, when the current half-wave is at its peak, and welding commences at the reduced current A and changes over to the rated current B after the time interval t1. It is also known to lower the current towards the back end of the article, e.g. to the value C, as the back end of the article or can body has already been heated by a forward diffusion of heat through the article or body. In FIG. 1 this is indicated by time Pt. 3, the start of a time interval t2 governed by the position of the carriage and effecting a reduction of the current to the value C at the back end of the welded article. After the welded article has run through, the movement of the rollers and/or wires is stopped, and the welding current switched off, at time Pt. 4. FIG. 2 shows this known process for the case where coated, e.g. zinc galvanized, leaded, or aluminized, sheets are to be welded. These require higher welding currents than uncoated sheets, because of the presence of the coating. The higher welding current if applied as an uninterrupted alternating current can cause burning, and for this reason it is known to activate the welding current in bursts and to provide pauses between bursts (the so-called "stitch weld" process). FIG. 2 shows such a process with a current/pause ratio of 2:1 as an example. In other respects the conditions are the same as in FIG. 1: Pt. 1 is the starting-point for the movement of the wires and the impression of the reduced current A, Pt. 2 defines the starting-point for the time interval t1, and is triggered by the position of the carriage, and at the end of t1 the rated current value B is impressed. Time Pt. 3, again governed by the position of the carriage, initiates the time interval t2, which triggers the reduction of the current to the final value C, and at time Pt. 4 the machine is stopped. Usually when the reduction is made to the current value C there is a changeover to uninterrupted alternating current, as shown in FIG. 2. Again in the case of the stitch weld process, the point on the current curve at which the leading edge of the article to be welded impinges on the welding rollers and/or electrode wire is undefined. In FIG. 2 this is shown as happening by chance at the point where the welding current passes through zero, but it could happen anywhere within a welding current burst or a welding current pause. Thus, although it is true that in the state of the art the initial weld point is welded at reduced current A, the weld quality at the initial point may vary. When the leading edge of the article to be welded impinges on an intermediate wire electrode that is already live, and therefore hot, a wire break may occur, especially if at that moment the intermediate wire electrode is being subjected to a peak current level (FIG. 1). The electrode is particularly susceptible to such damage when thick sheets, with a thickness of e.g. 0.5 to 1.25 mm, are being welded, where with a single overlap the material to be welded has twice the thickness, and with a folded or doubled overlap, four times the thickness.

DISCLOSURE OF THE INVENTION

Therefore a fundamental problem of the invention is to provide a method for welding sheet overlaps, particularly in thick sheets, that does not have the stated drawbacks.

For a method of the kind stated at the outset, this problem is solved by a method for welding an overlapping article of sheet metal on a welding apparatus that includes welding electrode rollers, wherein welding current is not applied to the welding electrodes until the article to be welded is between the electrodes.

By deliberately not applying welding current to the electrodes until the article to be welded is between the welding electrodes, the drawbacks can be overcome. It has been found that welding problems at the initial point and breaks in the wire no longer occur. By adopting this measure, it is even possible to dispense with the initial reduction in welding current, so that welding is performed with the rated welding current value preferably from the start.

Preferably, the moment of switching-on is derived from the deflection of an electrode roller, preferably the upper electrode roller. This gives a particularly reliable indication of the actual position of the leading edge of the article between the electrodes.

A further fundamental problem of the invention is to provide a welding apparatus that does not have the stated drawbacks.

For a welding apparatus of the kind stated at the outset, this problem is solved by a welding apparatus that includes welding electrode rollers, a welding current source, controllable switch arrangement, a control device, and a switch means. The welding current source is connected to the welding electrodes by the controllable switch arrangement, and the control device controls the switch arrangement. The switch means, which is connected to the control device, is triggered by the position of the forward or rear edge of the article to be welding via the welding electrode rollers. The control device is configured to receive from the switch means a signal indicating the position of the edge of the article to be welded with respect to the electrode rollers and in dependence thereon to deliver to the switch arrangement a signal releasing the welding current to the electrode rollers and/or the intermediate wire electrodes.

These and other objects, features and advantages of the present invention will become apparent in light of the detailed description of the invention, and the accompanying drawings.

BRIEF DESCRIPTION OF THE DRAWINGS

The state of the art and examples of ways of carrying out the invention will now be described in detail with reference to the figures, in which.

DETAILED DESCRIPTION OF THE INVENTION

Figure 1:
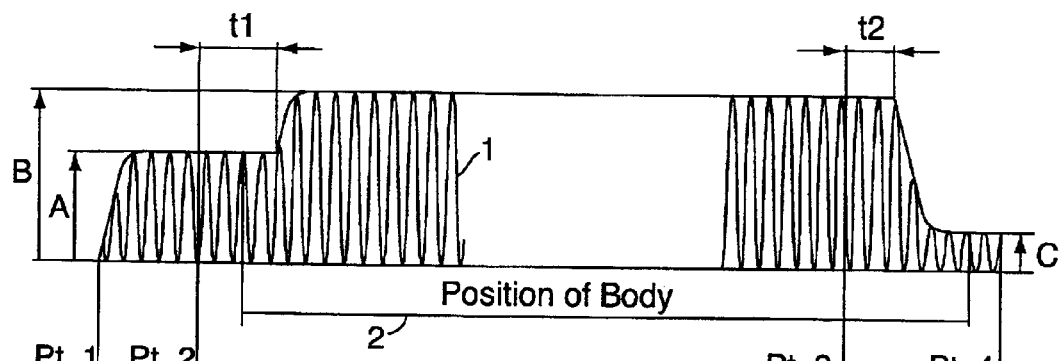
FIG. 1 is a schematic diagram of the welding current curve in relation to the position of an article to be welded, according to the state of the art.
Figure 2:
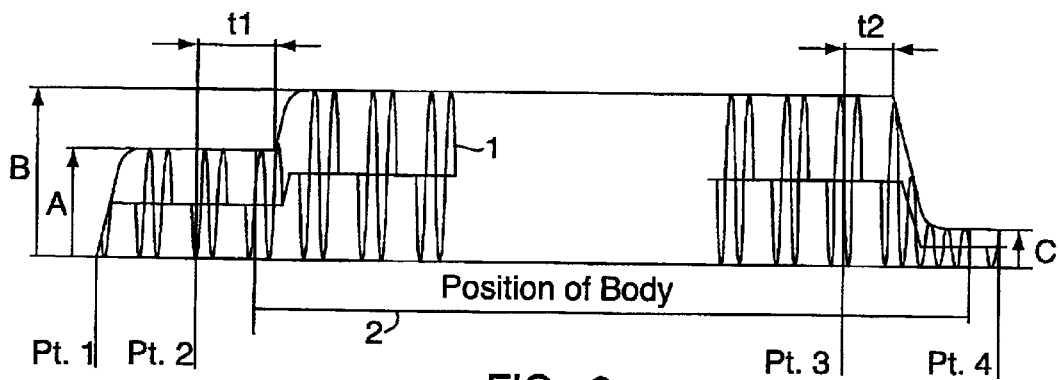
FIG. 2 is a similar state-of-the-art diagram to FIG. 1 showing welding current for stitch welding.

FIG. 1 shows the curve of welding current 1 that has already been described for welding a can body 2 in accordance with the state-of-the-art. FIG. 2 shows the fundamentally similar curve of current in the stitch weld process as already described in the introduction.

Figure 3:
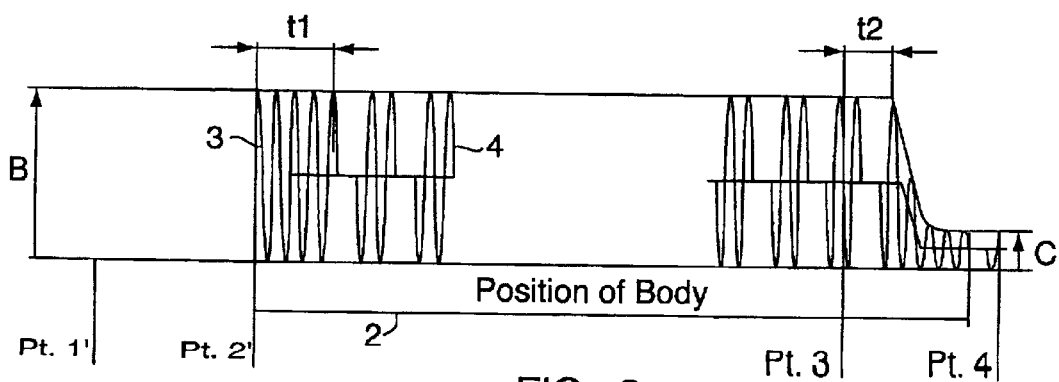
FIG. 3 is a schematic diagram of the welding current curve according to one way of carrying out the invention.

FIG. 3 shows, in the same mode of representation, the curve over time of the welding current 3, 4, over a can body 2 as welded article. At time Pt. 1' the drive to the electrode rollers and/or wires is started, as is known in principle and as need not be further described here. However, the electrodes still carry no voltage or current. The welding voltage/current is not switched through to the electrodes until time 2', when the article or can body 2 has passed between the electrode rollers and wires. This preferably takes place at the passage through zero as shown in FIG. 3. Surprisingly, it has been found that by adopting this measure it is even possible for the initial reduction in current to be abandoned altogether (though the reduction can of course still be made as before). Preferably, as shown in FIG. 3, welding is performed with the rated current value B from the outset. To obtain a weld of high quality, it is moreover preferred that welding be initially performed with uninterrupted alternating current e.g. for a segment of scam length of 5 to 30 mm, particularly 10 to 20 mm, and especially approx. 15 mm. Thereafter a changeover can be made, as shown, to the stitch weld process with individual bursts 4 of welding current, as known from the state-of-the-art. But it is also possible to continue welding with uninterrupted alternating current; the choice will depend on the type of sheet, as already known in the state-of-the-art. The end of the welding is no different from the state-of-the-art, and the remarks made on the state-of-the-art with regard to the times Pt. 3 and Pt. 4 and time interval t2 still apply.

To carry out the method, it is important to detect the position of the article or can body so that the welding current from the current source is applied just as the article being conveyed in the welding direction arrives between the electrodes, so that the initial point can be welded with the welding current which is then applied. The moment for switching one, or for applying the current, is therefore preferably derived from the position of the article itself, not from the device conveying it to the welding rollers. In particular, it is derived from the leading edge of the article, or from the trailing edge if the length of the article is known. If the position of the edge is detected at a predetermine point ahead of the welding rollers, e.g. by a light barrier, then provided that the rate at which the article for welding is being fed by the conveyor device of the apparatus is known, the moment when the article is located between the electrodes, so that the initial welding point must be set by switching on the welding current, is known. Hence the control device 20 (FIG. 4) of the welding apparatus can determine the moment for switching-on Pt. 2' from the edge position signal and the rate of feed, and possibly also the length of the article to be welded. Preferably, however, the moment for switching-on is derived from the deflection of the welding rollers, and in particular of the upper welding roller if the lower welding roller is fixed. The deflection of the welding roller gives a direct indication of the desired position of the article between the welding rollers. This indication can be fed to the control device of the welding apparatus, so causing welding current to be applied to the electrodes.

Figure 4:
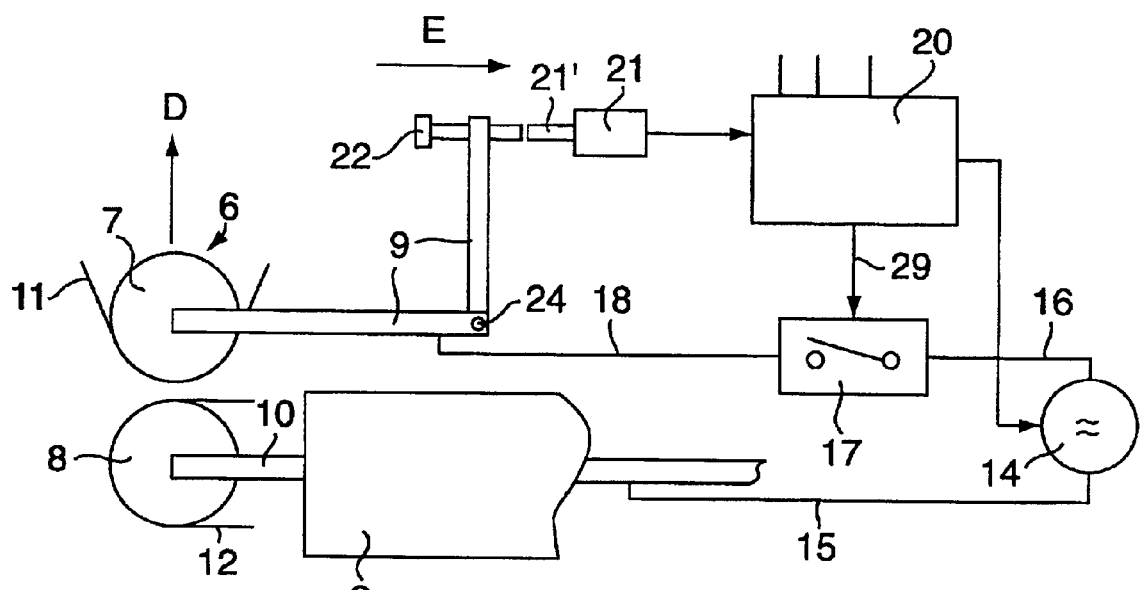
FIG. 4 is a schematic view of the electrodes and controls of a welding apparatus to elucidate the invention.
Figure 5:
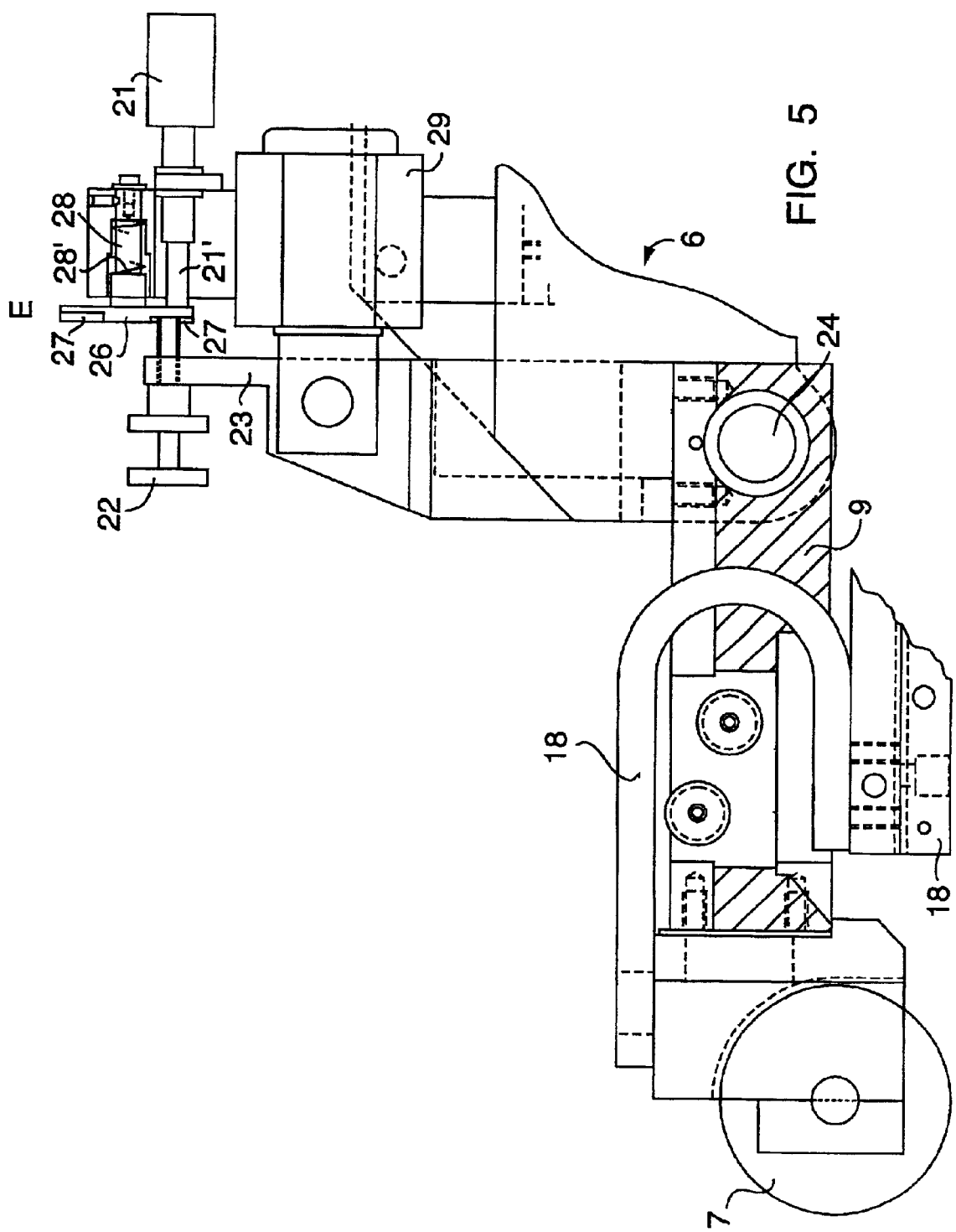
FIG. 5 is a partial view of a welding apparatus according to one embodiment of the invention.

FIG. 4 shows a schematic view of a welding apparatus 6 to elucidate this process, and FIG. 5 shows a corresponding detail view of part of the welding apparatus. In FIG. 4 a welding apparatus 6, with a lower welding electrode roller 8 and upper welding electrode roller 7, which is being used to weld an article 2, is shown; the article 2 is being conveyed between the welding rollers 7, 8 by a conveyor device which is not shown, e.g. a travel carriage.

The lower welding roller 8 is arranged in a known manner on a welding arm 10 which is surrounded by the article 2 to be welded. Preferably an intermediate wire electrode 12, which in a known manner is guided in the welding machine and forms a constantly replenished welding electrode, is provided on the lower welding roller 8. The same applies to the upper welding roller 7 provided with the intermediate wire electrode 11 of which, as in the case of the lower intermediate wire electrode 12, only a small portion is shown. The upper welding roller 7 is arranged on an upper arm 9 which is pivotable about the axis 24. The lower welding roller 8 and its welding arm 10 are usually fixedly mounted, and the upper welding arm 9 together with the roller 7 can be pressed against the lower welding roller 8 by an actuating device 29 (FIG. 5) to apply the necessary welding force. This actuating device permits an elastic upward tilt in the direction of the arrow D (FIG. 4) on insertion of the article 2 between the welding rollers. Preferably, this deflection of the upper welding roller is detected in order to derive a signal which indicates that the article 2 for welding is between the welding rollers 7 and 8. FIG. 4 shows an electric switch 21 provided for this purpose, whose actuating element 21' is operated by an actuating member 22 adjustably mounted at the top of the welding arm, when the welding roller moves upwards in the direction D and the upper end of the welding arm 9 moves in the direction of the arrow E. The actuating member 22 is adjustably arranged at the top end of the arm 9 so that the actuating element 21' is operated only beyond a predetermined deflection which is dependent on the thickness of the overlap, or the actual sheet thickness of the article 2 to be welded. When actuation of the switch 21 by deflection of the upper welding roller transmits a signal to the control device 20, the latter in turn transmits an activation signal via the signal path 29 to the switch element 17, which applies the welding current from a welding current source 14 via leads 15, 16 and 18 to the welding electrodes. The welding current source 14 is preferably controllable so that the amplitude and frequency of the welding current B can be adjusted by means of the control device 20. The switch element 17 is preferably such an element, which switches the welding current/voltage only at a passage through zero. Such switches are well known in electronics, and will not be described further here. In the way which has been indicated, the welding current curve can be generated by the method so that welding current is not applied to the welding electrodes until the article to be welded is between the welding electrodes.

FIG. 5 shows a more accurate representation of the upper part of the welding machine with the upper welding roller 7 and the welding arm 9, which is able to pivot on the machine frame about a fixed pivot axis 24. Current is supplied to the upper welding roller via a bus bar 18. The actuating member 29 serves to press the upper welding roller 7 elastically against the article to be welded and to tilt the roller 7 away to load the welding machine with the article to be welded. The switch 21 with its actuating element 21' is also mounted on the machine frame. At the upper end 23 of the welding arm 9, the adjusting member 22 is again shown. By means of this adjusting member 22, a basic setting can be made for the actuation of the switch 21 upon upward deflection of the welding roller 7. A further setting element 26 which is interposed between the adjusting means 22 and the actuating element 21' of the switch 21 is provided for adaptation to the varying sheet thicknesses of different articles. This setting element 26 is preferably a disk with regions of different thickness which can be inserted between the adjusting element 22 and the actuating element 21' to suit the thickness of the sheet metal. It may for example be a rotatable disk 26 with pockets 27 machined to different depths so that the residual thickness of the disk, which is placed between the parts 22 and 21', can be matched to different specified sheet-metal thicknesses.

Figure 6:
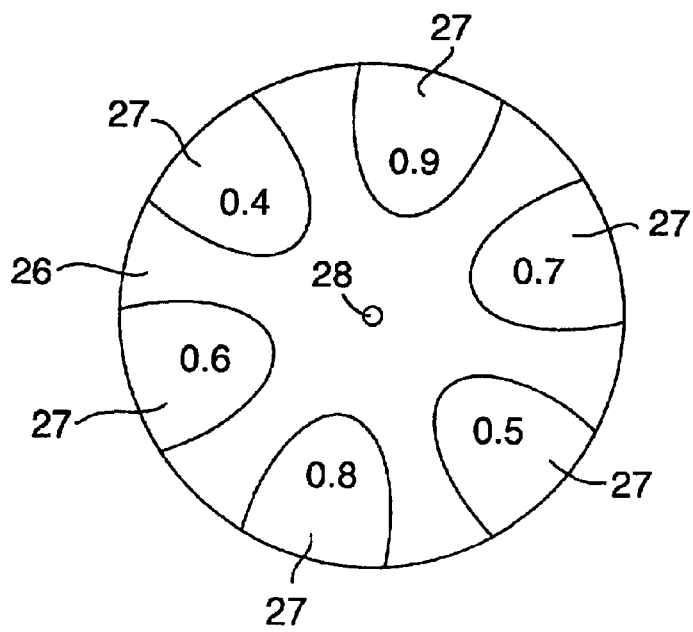
FIG. 6 is a top view of the setting disk for sheet thickness.

FIG. 6 shows a corresponding circular disk 26 with six different pockets 27 each marked with the corresponding single sheet thickness. The disk 26 is mounted rotatably about an axle 28 on the machine frame so that each of the pockets 27 can be brought into engagement between the parts 22 and 21' simply by turning the disk, the residual thickness of the disk in the region of the pocket then directly determining the deflection of the welding roller 7 at which the switch 21 is thereby actuated. Thus the welding machine operator has only to press the disk 26 in the direction of the arrow E against the spring 28' arranged around the axle 28 in order to free the disk 26 for turning, and rotate the disk so that the pocket showing the specified sheet thickness engages between the parts 22 and 21'. The disk 26 is then pushed forwards again towards the element 22 by the spring 28', and the element 21' is also restored by the spring of the switch 21 to the position shown in FIG. 5. In this way, adaptation can easily be made to the specific thickness of sheet material of the article to be welded.

Although this invention has been shown and described with respect to the detailed embodiments thereof, it will be understood by those skilled in the art that various changes in form and detail thereof may be made without departing from the spirit and the scope of the invention.

What is claimed is:

1. A welding apparatus with welding electrode rollers, an AC welding current source that is selectively connectable to the electrodes by a controllable switch arrangement, and a control device for the switch arrangement, characterized in that:

a means connected to the control device is provided which is triggered by the deflection of at least one of the welding rollers caused by the article passing between the electrode rollers; and wherein the control device is configured to receive from the means a signal indicating the edge of the article to be welded has entered between the electrode rollers and in dependence thereon to deliver to the switch arrangement a signal releasing the welding current to the electrode rollers; and wherein the control device is configured to receive from the means a signal indicating the edge of the article to be welded has exited between the electrode rollers and in dependence thereon to deliver to the switch arrangement a signal to discontinue the welding current to the electrode rollers.

2. A welding apparatus according to claim 1, characterized in that the means for detecting the deflection comprises a setting arrangement by means of which the response to the position of the leading edge of the article to be welded is adaptable to the thickness of the article.

3. A welding apparatus with welding electrode rollers, an AC welding current source that is selectively connectable to the electrodes by a controllable switch arrangement, and a control device for the switch arrangement, characterized in that:

a means connected to the control device is provided which is triggered by a forward edge of an article to be welded entering, or the rear edge of an article exiting, between the welding electrode rollers, wherein the means is configured to detect the deflection of at least one of the welding electrode rollers by the article passing between the electrodes, the means including a setting arrangement by means of which the response to the position of the leading edge of the article to be welded is adaptable to the thickness of the article;

wherein the control device is configured to receive from the means a signal indicating the edge of the article to be welded has entered between the electrode rollers and in dependence thereon to deliver to the switch arrangement a signal releasing the welding current to the electrode rollers;

wherein the control device is configured to receive from the means a signal indicating the edge of the article to be welded has exited between the electrode rollers and in dependence thereon to deliver to the switch arrangement a signal to discontinue the welding current to the electrode rollers; and wherein the setting arrangement has a disk with a plurality of regions of different thickness in a predetermined proportion to the thickness of the articles to be welded.

4. A welding apparatus according to claim 3, characterized in that the disk is rotatably arranged, and the regions are recesses of different depth in the disk which are preferably each marked with the corresponding thickness of the article to be welded.

5. An apparatus for welding sheet metal articles, comprising:

at least two electrode rollers;

a welding current source;

a controllable switch arrangement for selectively providing welding current from the welding current source to the at least two electrodes; and a switch means for signaling the presence of one of the sheet metal articles between the electrode rollers, wherein the switch means is triggered by the deflection of at least one of the electrode rollers by the article passing between the rollers, and the switch means has a first signal output when one of the sheet metal articles is disposed between the electrode rollers, and a second signal output when none of the sheet metal articles are disposed between the electrodes;

wherein the switch means changes from the second signal output to the first signal output when an edge of the sheet metal article is disposed between the electrode rollers.

6. The apparatus of claim 5, wherein the switch means includes a pivotally mounted arm for mounting one of the at least two electrode rollers, wherein inserting the edge of the sheet metal article to be welded causes the arm and mounted roller to pivot away from another of the at least two electrode rollers.

7. A welding apparatus according to claim 1, further comprising intermediate wire electrodes, wherein upon receipt of the signal indicating the edge of the article to be welded has entered between the electrode rollers, the control device delivers to the switch arrangement a signal to release the welding current to the intermediate wire electrodes; and wherein upon receipt of the signal indicating the edge of the article to be welded has exited between the electrode rollers, the control device delivers to the switch arrangement a signal to discontinue the welding current to the intermediate wire electrodes.

8. An apparatus as is claim 1 wherein the control device switches the welding current to the electrode rollers only when the voltage/current is passing through zero.

9. An apparatus as in claim 5 wherein the switch means switches the welding current to the electrode rollers only when the voltage/current is passing through zero.

* * * * *